United States Patent [19]

Ellis, Jr.

[11] 4,339,307
[45] Jul. 13, 1982

[54] DISTILLATION APPARATUS

[76] Inventor: John C. Ellis, Jr., 493 Ellendale Ave., Port Chester, N.Y. 10573

[21] Appl. No.: 22,321

[22] Filed: Mar. 20, 1979

Related U.S. Application Data

[63] Continuation-in-part of Ser. No. 761,332, Jan. 21, 1977, abandoned.

[51] Int. Cl.³ .......................... B01D 3/02; C02F 1/04
[52] U.S. Cl. .................................. 202/176; 202/180; 202/181; 202/185 C; 202/185 D; 202/190; 202/194; 202/196; 202/197; 202/206; 202/234; 202/268; 202/269; 203/1; 203/10; 203/22; 203/DIG. 22; 219/275; 219/328; 219/523; 277/166; 277/206 R
[58] Field of Search .................. 202/181, 189–197, 202/201, 206, 185 R, 185 B, 185 C, 185 D, 235, 266–270, 163, 83, 180, 234; 203/10, 11, 1, 40, 22, DIG. 22; 219/272, 273, 275, 316, 328, 335, 336, 523; 249/82; 277/166, 206 R

[56] References Cited

U.S. PATENT DOCUMENTS

| | | | |
|---|---|---|---|
| 284,011 | 8/1883 | Herrick | 203/DIG. 17 |
| 633,851 | 9/1899 | Kemp | 202/206 |
| 1,297,369 | 3/1919 | Lepper | 219/275 |
| 1,316,214 | 9/1919 | Wright | 202/197 |
| 1,369,438 | 2/1921 | Jewell | 203/DIG. 17 |
| 1,611,673 | 12/1926 | Plumly | 202/194 |
| 1,935,183 | 11/1933 | Hapgood | 202/180 |
| 2,881,116 | 4/1959 | Siegfried | 202/197 |
| 3,318,784 | 5/1967 | Murphy | 202/173 |
| 3,319,048 | 5/1967 | Wells | 219/523 |
| 3,532,606 | 10/1970 | Sibert | 202/180 |
| 3,767,898 | 10/1973 | Wells et al. | 219/523 |
| 3,830,705 | 8/1974 | Dewegeli | 203/10 |
| 3,838,016 | 9/1974 | Powers | 202/181 |
| 3,930,959 | 1/1976 | Kirschmann | 202/185 B |
| 3,935,077 | 1/1976 | Dennison | 203/1 |
| 3,975,241 | 8/1976 | Smith | 202/197 |
| 4,135,984 | 1/1979 | Kirschmann | 202/83 |

Primary Examiner—Wilbur L. Bascomb, Jr.
Attorney, Agent, or Firm—Eugene E. Geoffrey, Jr.

[57] ABSTRACT

The apparatus includes a housing enclosing a boiler in the lower portion and a water-filled condenser in the upper portion with an insulated partition between them. The entry of boiler feed water is controlled by a float valve in the boiler, and steam from the boiler is conveyed through the partition and thus through a condenser coil substantially immersed in the water in the condenser.

9 Claims, 5 Drawing Figures

DISTILLATION APPARATUS

This application is a continuation-in-part of U.S. patent application Ser. No. 761,332 filed Jan. 21, 1977, and now abandoned, for "DISTILLATION APPARATUS".

This invention relates to liquid distillation apparatus which is especially useful for home use in distillation of water to thereby remove impurities therefrom.

Because of increasing water pollution, and because of an increasing awareness of water pollution, there has been an increasing demand for the ultimate in water purification, that is: apparatus for actual distillation of water. Thus, there is an increasing demand for distilled water, not only for traditional uses, such as for batteries and for steam irons, but also simply to make the water potable. Furthermore, it is believed that the symptoms of some diseases such as arthritis are relieved by the ingestion of distilled water, rather than untreated tap water which often contains high percentages of minerals.

Prior attempts to produce an efficient home water distillation apparatus have met with only limited success. Typically, such apparatus has used air cooled condenser coils with a fan to blow air over the coils. Such prior apparatus has been noisy, and has generated a lot of undesired heat and has released raw steam into the atmosphere. Furthermore, such prior apparatus has been very bulky, expensive, and has operated at low efficiency.

Accordingly, it is an object of the present invention to provide an improved distillation apparatus which is especially useful for domestic use for distillation of water and which provides high efficiency, small size, and very low emission of heat and steam into the atmosphere.

Another problem with prior distillation apparatus has been that frequent cleaning is necessary in order to purge the apparatus of residual materials such as minerals and mineral salts which remain after the liquid being distilled is boiled off.

Accordingly, another object of the invention is to provide an improved distillation apparatus which is self-cleansing to a high degree.

It is another object of the invention to provide distillation apparatus which preconditions the liquid to be distilled before it enters the boiler.

Another problem with prior distillation apparatus is that certain volatile, and sometimes odoriferous gases may be in solution in the tap water, and may not be fully removed by the distillation process because, while such gases are driven out of solution in the boiler, they are immediately absorbed back into solution in the distillate.

Prior art domestic water distillers have been so ineffective in eliminating the gases which are in solution in the water which is being distilled, and which cause bad taste and smell in the water, that it has been a common practice to put the distilled water through a charcoal filter, after distillation. While this is an effective method of removing the dissolved gases which cause the bad odor and taste, it substantially defeats the purpose of the distillation operation because the charcoal filtering operation can add impurities to the distilled water. It has been suggested by some authorities that the charcoal filtering may add carcinogens to the water. The present invention avoids the necessity for any charcoal filtering step and maintains the purity of the distilled product.

Accordingly, it is another object of the present invention to provide an improved distillation apparatus and method in which there is at least one stage of preheating of the liquid to be distilled so as to drive out volatile gases from solution in the liquid to be distilled prior to the evaporation and subsequent condensation so as to prevent those gases from going back into solution in the condensate.

Still another object of the present invention is to provide a small distillation apparatus which is extremely safe because it is operated at atmospheric pressure, and does not require a pressure vessel.

Further objects and advantages of the invention will be apparent from the following description and the accompanying drawings.

In carrying out the invention there is provided a liquid distillation apparatus which is especially adapted for home use in distillation of water comprising an enclosed boiler, a condenser, said condenser comprising a condenser tube having a connection to said boiler for receiving and condensing vaporized liquid from said boiler, said condenser also comprising a housing surrounding said tube and arranged to be filled with liquid as a heat transfer medium for cooling said tube, means for cooling the heat transfer medium liquid within said condenser, and a connection from said condenser to said boiler for providing a portion of said heat transfer medium liquid to said boiler as pre-heated boiler make-up liquid, said pre-heated boiler make-up liquid being the exclusive source of make-up liquid for said boiler.

Figure 1:
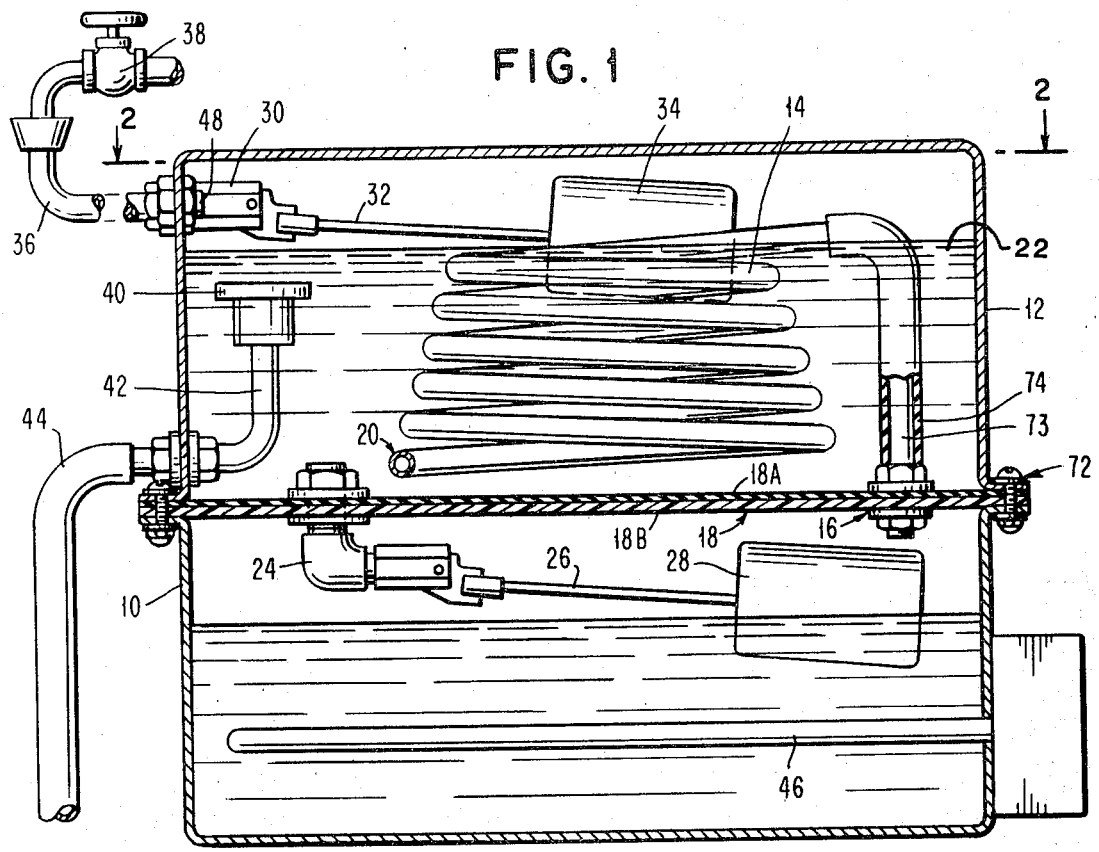
FIG. 1 is a sectional side view of a preferred embodiment of the invention.
Figure 2:
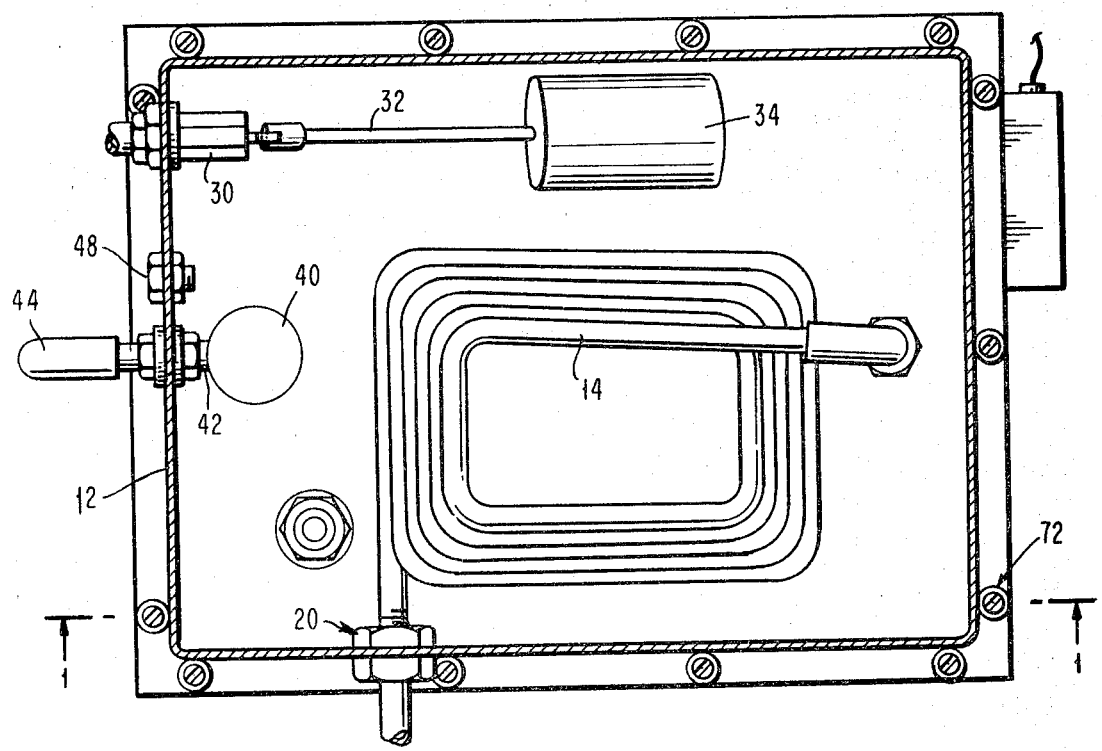
FIG. 2 is a sectional top view taken at section 2—2 of FIG. 1 and showing the internal arrangements of the condenser part of the apparatus.

Referring more particularly to FIGS. 1 and 2, the apparatus includes an enclosed boiler 10 and a condenser 12 including a condenser tube 14 which has a connection to the boiler 10 at 16 through an opening in a partition member 18 which divides the boiler from the condenser. The condenser tube 14 thus receives and condenses vaporized liquid from the boiler 10, and the condensate is available at an outlet indicated at 20 which is at the lowest part of the condenser tube. The condenser 12 also includes a housing which surrounds the tube 14 and is arranged to be filled with liquid, indicated at 22, which serves as a heat transfer medium for cooling the condenser tube 14. There is also included a means for cooling the heat transfer liquid medium within the condenser. This will be described more fully below.

A connection is provided through the partition 18 from the condenser 12 to the boiler 10 by means of a float valve indicated at 24 and having an arm 26 and a float member 28. By means of this float valve, whenever the liquid within the boiler 10 is evaporated away sufficient to lower the liquid level below a desired minimum value, the float valve 24 is opened by the associated float 28 to admit heat transfer medium liquid 22 from the condenser 12 through the valve 24 as make-up liquid within the boiler 10. This is the exclusive source of make-up liquid for the boiler. The level of liquid within the condenser 12 is also controlled, preferably by means of a separate float valve indicated at 30 having an arm 32 and a float 34. Thus, when the heat transfer medium liquid is depleted by the opening of valve 24, the float valve 30 is opened to admit cool liquid, such as tap water, through a supply hose 36 from a conventional tap 38.

While the present invention may have uses other than the distillation of water, its primary utility is believed to be for the distillation of water, and it is described in terms of utilization for that purpose throughout the specification.

The preferred forms of the invention specifically disclosed in connection with the drawings of the present patent application are particularly adapted for use as a portable distillation apparatus which can be easily and quickly installed on a kitchen sink counter, or a laundry sink counter next to the sink where cold water is readily available for the apparatus, and where overflow water can be easily disposed of.

The valve 24, which drains preheated water from the condenser into the boiler, and the valve 30, which admits cool water into the condenser 12 each constitute at least a portion of the means for cooling the heat transfer medium liquid within the condenser. Thus, the operation of these valves results in a replacement of heated liquid with cool liquid, thus lowering the average temperature of the liquid 22 within the condenser 12. In order to further cool the liquid 22 within the condenser 12 when necessary, another outlet from the condenser is preferably provided. Such an outlet may simply provide a constricted drain which permits a metered continuous flow of water from the condenser, to be replaced by cool water from the inlet valve 30. However, in order to maintain maximum efficiency of operation, it is preferred to provide a thermostatically operated drain valve, as indicated at 40. This thermostatically operated drain valve 40 may be very similar in design and construction to the thermostatic valve commonly employed in the water cooling systems of automotive vehicles. In one preferred embodiment, a valve which is calibrated to open at 82° C. is employed. When the valve 40 opens, the water in the condenser is permitted to flow downwardly through a drain connection tube 42, and through a drain hose 44.

While other sources of heat may be employed, in a preferred embodiment, the boiler 10 is heated by an electrical immersion heater indicated at 46. The boiler 10 is preferably provided with a drain valve 47 at the lower portion thereof for periodically purging any impurities which may collect in the boiler.

Both the condenser 12 and the boiler 10 are vented to the atmosphere. The vent for the boiler is provided through the condenser tube 12 and the outlet 20 of that tube. A separate atmospheric vent is provided near the top of the condenser as indicated at 48.

The construction of the apparatus according to the present invention provides a number of significant advantages. The liquid heat transfer medium 22 surrounding the condenser tube 14 provides for much more efficient operation of the condenser than is available when using air as the heat transfer medium. For instance, when using air as the heat transfer medium, it is usually necessary to provide an electric fan for the purpose of promoting the flow of air over the condenser coils. In most communities, the cost of water, and the cost of electricity are such that it is much more economical to buy the additional water which is needed for cooling the condenser than it is to buy the additional electricity that is required to run the fan for an air cooled condenser. Furthermore, there are very significant advantages to the use of the same liquid which is being distilled for the heat transfer medium, and thus using the condenser as a combined liquid preheater and liquid preconditioner for the boiler make-up liquid.

In a preferred embodiment of the invention, the thermostatic valve 40 does not open until the heat transfer medium liquid is at a temperature of 82° C. This means that a substantial preheating of the boiler make-up liquid occurs so that there is a significant saving in the energy input to the boiler necessary for keeping the water in the boiler up to boiling temperature. While it is clear that the operation of the condenser, as a condenser, is more efficient when the condenser heat transfer liquid is at a lower temperature, in one actual preferred physical embodiment, which is described more fully below, 82° C. was found to be a temperature which was sufficiently low to provide for efficient condensation of all of the steam emitted by the boiler within the tubing 14. Furthermore, when a thermostatic valve 40 having a lower calibration was tested, it was found that the resultant drop in temperature of the feed water supplied to the boiler caused a substantial decrease in the output of distilled water from the apparatus. Thus, when a thermostatic valve calibrated to open at 71° C. was substituted for the 82° C. valve, the output rate of distilled water dropped by about twenty-five percent. Thus, it was clearly demonstrated that there is a very substantial improvement in the efficiency of the apparatus by reason of the preheating of the boiler feed water in the condenser.

Furthermore, the preheating of the boiler feed water in the condenser preconditions that water by driving off gases which may be in solution in the water which are expelled through the vent 48 and thus do not remain in the water as it is supplied to the boiler. If such gases did remain the the water when supplied to the boiler, they would be driven out of the boiler water and would be expelled through the condenser tube 14 where they would recombine with the condensate water in the condenser tube and thus remain as contaminants within the distilled water. Accordingly, the provision of the vent 48 in the housing of the condenser is very important in conjunction with the preheating of the boiler feed-water. Still further, it has been found that there are various contaminating materials within tap water which are precipitated by the preheating in the condenser and are caused to be expelled from the condenser through the thermostatic valve 40 rather than passing down into the boiler where they would accumulate and cause fouling and contamination of the boiler 10. Thus, the apparatus is self-purging with respect to contaminants of that nature.

While it is possible to operate the condenser housing 12 at the same pressure as the tap water, and thus eliminate the need for the float valve 30 at the water inlet to the condenser 12, such a simplification of the apparatus has a number of major disadvantages. For one, it is not possible to vent the condenser to the atmosphere, and thus, the gases which would otherwise be driven from the preheated liquid cannot be expelled from the condenser, as discussed immediately above. Furthermore, since tap water pressures vary greatly from one community to another, the condenser housing must be designed to withstand the highest anticipated tap water pressure, considerably increasing the cost of the apparatus and increasing the risk of possible failure and flooding.

Preferably, the entire boiler 10 and condenser 12 and condenser tube 14 are constructed of stainless steel in order to avoid corrosion problems and in order to maintain the purity of the distilled water produced by the apparatus.

The partition 18 preferably includes at least two layers 18A and 18B, the bottom one of which is a polypropylene plastic, which may be in the order of 3 mm. thick and which is capable of withstanding the temperature of the boiling water within the boiler 10, and which provides substantial thermal insulation between the boiler 10 and the condenser 12. The upper layer 18A of the partition 18 preferably consists of a white neoprene rubber about 1.5 mm. thick which provides further heat insulation, and which also serves as a gasket for sealing the joint between the partition 18 and the shell of the condenser 12. If desired, for added strength, a sheet of stainless steel may be employed as a center layer in the partition 18. The stainless steel layer provides additional strength. The polypropylene layer may then be reduced in thickness, if desired. The condenser 12 and the boiler 10 may be substantially identical stainless steel shells with flanges which are bolted together with the edges of the partition 18 as indicated at 72.

In a preferred physical embodiment of the invention constructed in accordance with FIGS. 1 and 2, the following dimensions and physical constants were found to provide excellent results. The dimensions of the boiler were $11\frac{1}{3}$ cm. deep by 20 cm. wide by $27\frac{2}{3}$ cm. long, and the float switch 24 was adjusted to provide a normal water level within the boiler of about 7.5 cm. to thus provide for a volume of 4.15 liters of water within the boiler. The immersion heater 46 is a 1500 Watt heater.

The shell of the condenser 12 is exactly the same size as the shell of the boiler, and it too is arranged to be normally filled to a depth of about 7.5 cm. The condenser tubing is a 9.5 mm. outside diameter stainless steel tubing having an inside diameter of approximately 6.3 mm. and having a total uncoiled length of about 2.77 meters. The tubing is formed into a series of more or less rectangular coils which fit easily into the space within the condenser shell which is not occupied by the valve 40 and the float 34 for the float inlet valve 30, as illustrated in FIG. 2.

With the above mentioned construction and detailed embodiment, including a thermostatic valve 40 which is calibrated at 82° C., it has been found that the apparatus produces 1.9 liters of distilled water per hour with an overflow of about 11 liters per hour through the thermostatic valve 40 when the inlet water temperature is at about 5° C. If the inlet water temperature from the water tap 38 is higher than this, then more water must be discharged from the condenser through the thermostatic valve 40 to keep the condenser temperature down. Conversely, if the inlet supply water is lower in temperature, less water is passed by the thermostatic valve 40.

As mentioned above, if a thermostatic valve 40 having a lower temperature calibration such as 71° C. is employed, the efficiency of the apparatus drops drastically. On the other hand, if a higher calibration thermostatic valve is employed, such as one which is calibrated at about 90° C., with the specific structure described above, the steam produced by the boiler is not all condensed within the condenser tube 14, and a certain amount of steam is emitted from the coil outlet at 20. Accordingly, this is an unsatisfactory arrangement.

It has also been found that the efficiency of the condenser is improved by providing that the condenser tube 14 has a substantially vertical section 73 (shown in FIG. 1) which extends from the boiler outlet 16 directly to the highest point of the tubing 14. From then on, all of the remaining portions of the condenser tubing 14 are below the top of the vertical section 73. Thus, the condensate water which condenses from the steam is not permitted to flow back into the boiler, but flows by gravity to the outlet 20.

In order to further enhance the operation of the condenser, it has been found to be advantageous to provide an insulating sleeve 74 around the vertical portion 73 of the tube 14 to prevent any substantial heat transfer from the steam through the tubing to the heat transfer liquid 22 in the vertical section. Thus, there is a minimum of condensation which occurs in the vertical section 73 so that liquid is not caused to be condensed and to be delivered back to the boiler.

While the construction specifically illustrated in the drawings is preferred, it will be understood that since both the lower boiler housing 10 and the upper condenser housing 12 are operated at atmospheric pressure, the two housings may be fitted together by simply forming the condenser housing 12 as another open topped pan, and providing suitable grooves in the bottom of the condenser housing pan so that it can rest and be fitted onto the upper edges of the boiler housing. Thus the two housings may merely fit together like two pans of a double boiler, possibly with the addition of a lid at the top of the condenser housing. Alternatively, if desired, the two housings may be hinged together at one edge so that the condenser housing can be hingedly moved up off of the boiler so as to provide access to the interior of the boiler for cleaning.

While not shown in the drawings, it is also possible to modify the apparatus and improve the efficiency thereof by providing insulation around the exterior surfaces of the boiler 10. However, depending upon the effectiveness of that insulation, the wattage of the heating element 46 should be reduced in order to prevent boilovers of the boiler to thereby prevent delivery of undistilled boiled over water at the discharge 20.

Figure 3:
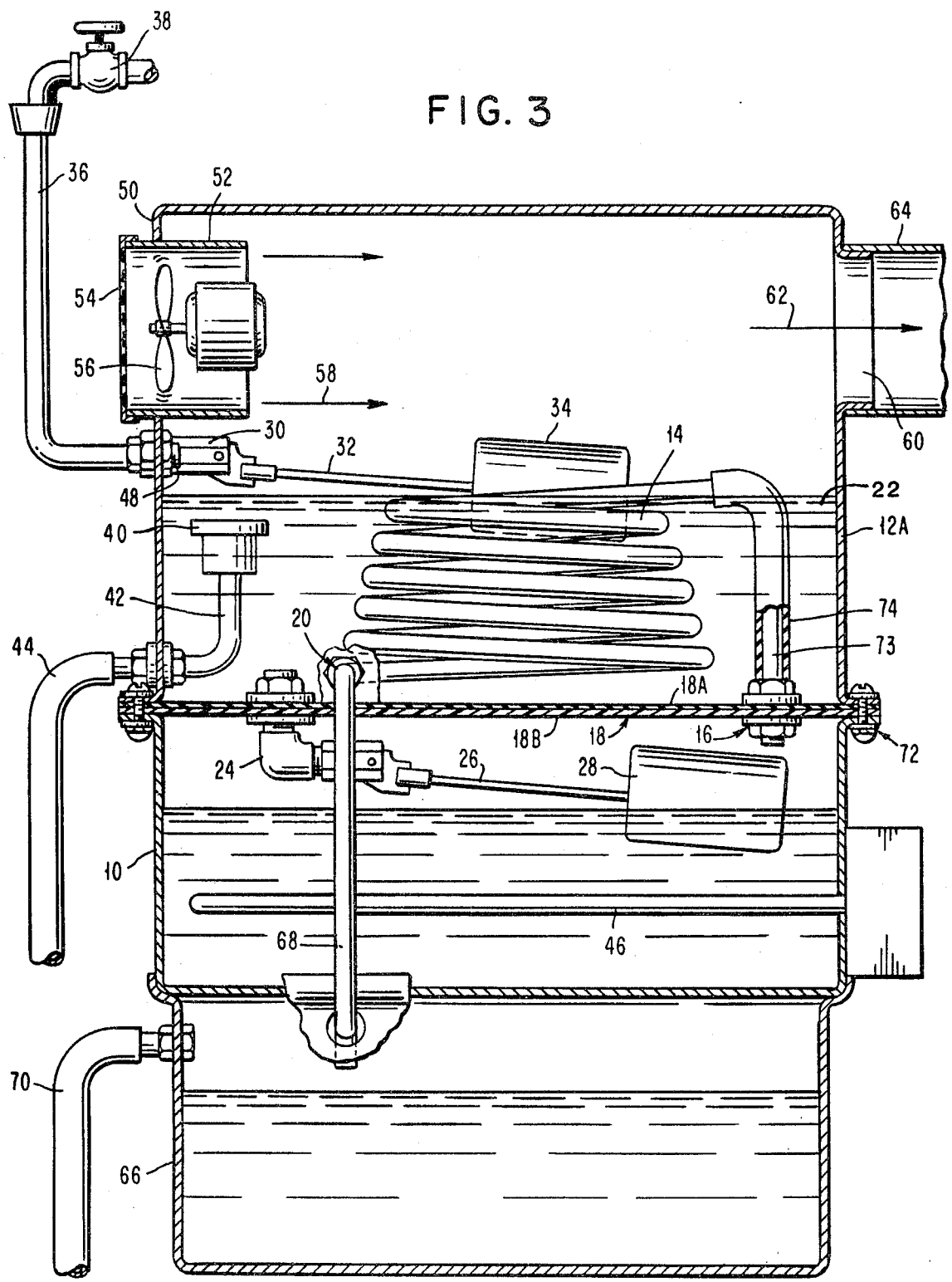
FIG. 3 is a sectional side view corresponding to the view of FIG. 1 and showing a modification of the apparatus of FIGS. 1 and 2.

FIG. 3 illustrates a modification of the apparatus of FIGS. 1 and 2 in which the means for cooling the heat transfer medium includes a modified condenser 12A having an upward extension 50 including a fan housing 52 having an air inlet 54 and a motor driven fan 56 which pulls air into the housing and across the upper surface of the heat transfer liquid as indicated at 58. An outlet is provided at 60 in the upper portion of the housing opposite the fan 56 in order to permit the air to be discharged from the housing, as indicated at 62. The passage of air through the housing above the surface of the heat transfer medium liquid provides for an acceleration of the evaporation of the liquid from the surface thereof, thus causing evaporative cooling of the liquid. This replaces or supplements the cooling of the liquid provided by the discharge of heated liquid through the thermostatic valve 40 and the immediate replacement with cool liquid from the inlet valve 30.

Preferably, an air duct 64 is provided and connected to the outlet 60 for venting the air 62 discharged from the housing to the outside in a manner similar to that used with domestic clothes driers. This prevents the accumulation of excess humidity within the dwelling. However, if additional humidity is desired within the dwelling, as during the heating season, the opening 60 need not be vented to the outdoors, and the apparatus operates as a humidifier to improve the humidity conditions within the dwelling.

The other feature added in the modification of FIG. 3 is the provision of an accumulator container 66 beneath the boiler 10 for the accumulation and storage of distilled water produced by the apparatus. For this purpose, an extension tube is preferably provided, as indicated at 68, from the end 20 of the condenser tube 14 to an inlet opening into the accumulator tank 66. However, care is taken to make sure that the tube 68 and the tank 66 provide a vent for the boiler, either by providing a loose fitting between the tube 68 and the cooperating opening in the container 66, or by venting the container 66. Such a vent may be provided by an overflow tube indicated at 70 which is connected to an opening near the top of the distilled water accumulator tank 66.

Figure 4:
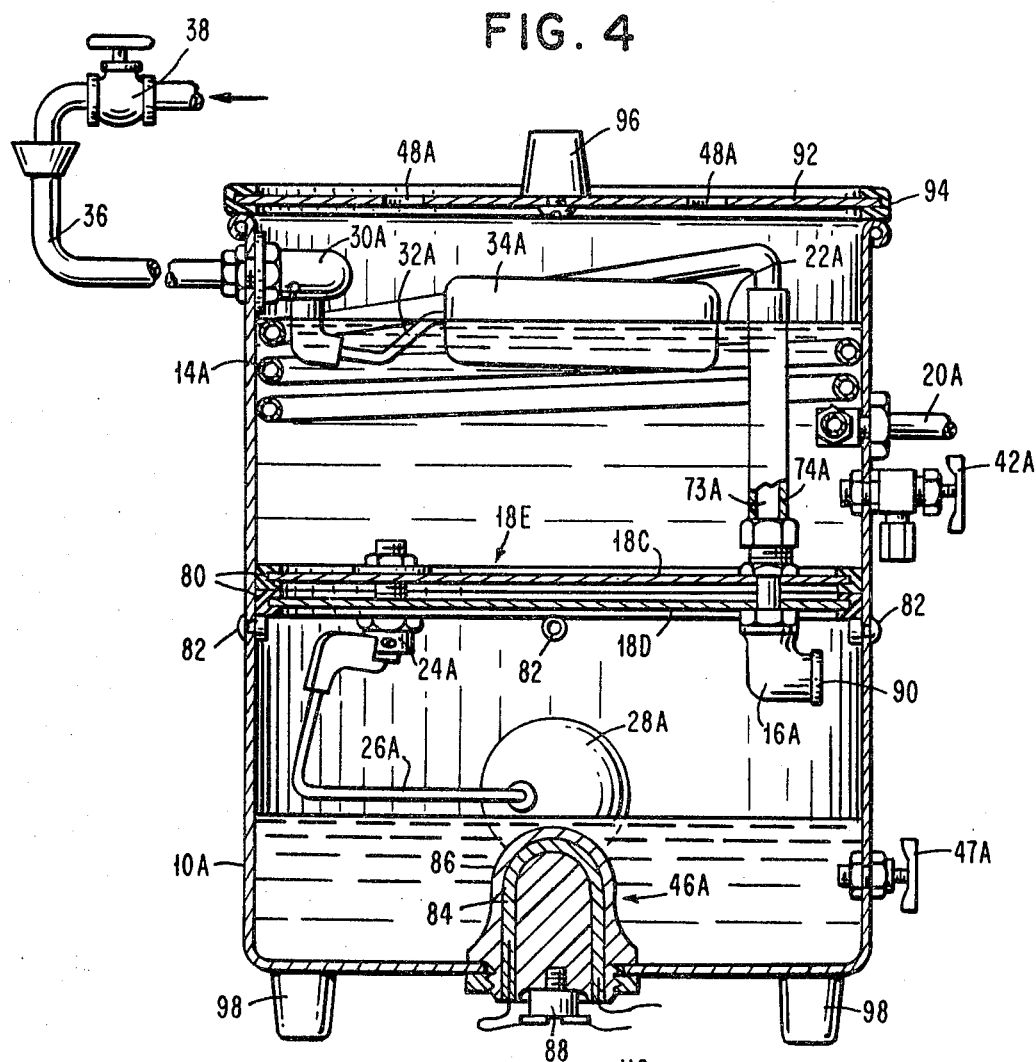
FIG. 4 is a sectional side view of a modified embodiment of the invention having an improved partition between the boiler and the condenser.

FIG. 4 is a side sectional view of a modified embodiment of the invention. Parts of the embodiment of FIG. 4 having direct counterparts in the embodiment of FIG. 1 are identified by corresponding numbers, with letter suffixes, generally the letter "A". Those parts are generally not described in detail again, unless there are important structural differences which are to be pointed out.

While the embodiment of FIG. 1 has a rectangular horizontal cross-section, in the preferred form of the embodiment of FIG. 4, the housing 10A has a circular horizontal cross-section. Thus, the housing 10A is preferably cylindrical in shape. In conformity with this, the condenser tube coils 14A are preferably arranged in a circular coil. A manually operated drain valve 42A is provided for the condenser heat transfer medium liquid.

One of the major differences in the FIG. 4 embodiment is that the housing 10A forming the boiler and the condenser is a unitary housing, which may be simply in the shape of a large cylindrical pot. The partition 18E consists of two circular metal plates 18C and 18D, each of which is provided with a U-shaped cross section edge gasket 80 which is snapped around the outer edge. The edge gaskets 80 serve to space the two plates 18C and 18D apart when they are placed adjacent to one another, so as to maintain an air space between the two plates to provide for thermal insulation therebetween. The edge gaskets 80 are composed of rubberlike material, which may preferably be a high temperature resistant rubberlike material. In a practical embodiment, the actual rubberlike material used is a butyl EPDM rubber having a nominal durometer hardness of 60. The term "rubber-like material" is used herein to include rubbers, as well as similar materials.

The partition 18E in FIG. 4 is press-fitted into place from the top opening of the enclosure 10A down to the position shown against support and positioning rivets 82 which are fastened into the side walls of the housing 10A. The dimensions of the plates 18C and 18D, and of the edge gaskets 80, are such as to provide an interference fit with the side walls of the housing 10A. However, the compressibility of the gasket 80 permits the press-fitting operation to be carried out with a reasonable force. It will be understood, of course, that the fittings on the walls of the housing 10A above the partition 18E are assembled after the insertion of the partition. This includes the float valve 30-A, the drain valve 42A, and the condenser tube outlet fitting 20A.

The press-fitted partition 18E of FIG. 4 provides a number of important advantages. One of the chief advantages is the economy of construction. Another advantage is that, if other precautions against higher boiler pressure fail, so as to create a safety hazard, it has been found that steam can leak from the boiler around the outer edges of the edge gaskets 80 and into the condenser fluid 22A, to be harmlessly condensed. Furthermore, if the pressure is not adequately dissipated by such leakage, the partition 18E is actually caused to be carried upwardly, thus permitting a harmless expansion of the boiler volume, and generally causing the partition to tilt to permit a massive relief of the boiler into the condenser. This is a very important safety feature of this embodiment.

While the preferred configuration of the housing 10A of the embodiment of FIG. 4 is cylindrical, it will be apparent that the same principles of construction, including the press-fitted partition, may be applied to housings having non-circular horizontal cross sections, as long as the partition shape conforms closely to the shape of the inside of the housing.

Another important feature of the embodiment of FIG. 4 is the incorporation and employment of a high mass electric heater 46A. The heater 46A includes a U-shaped electric heater element 84 which is embedded within a metal casting 86 which preferably has a generally cylindrical horizontal cross section with a hemispherical upper end. The high thermal mass provided by the casting 86 prevents the heater element 84 from burning out if the boiler is run with insufficient water. This is an important precaution because immersion electric heating elements are generally very vulnerable to burn-out if they are not fully covered with water. Additionally, the heater 46A is preferably provided with a thermostatic switch element 88 connected in series in the heater circuit to disconnect the heater whenever the heater temperature rises to a dangerous level above the normal operating temperature of the heater.

Another feature of the embodiment of FIG. 4 is a baffle 90 at the inlet 16A of the condenser tube. This baffle may consist simply of an L-shaped pipe fitting, preferably installed to face towards the nearest outer wall of the housing 10A to help to prevent turbulently boiling water from entering the end of the condenser tube. It is desired that only steam should enter the condenser tube so that any water emitted from the outlet of the condenser tube is actually distilled water. Additionally, the baffle 90 may include a fine screen attached over the end of the L fitting to assist in preventing the entry of water from the boiler without preventing the entry of steam.

The closure of the upper end of the condenser of the embodiment of FIG. 4 is preferably accomplished by a simple lid 92, similar to a pot cover, but including vent openings 48A. The lid 92 may include an edge gasket 94 similar to the edge gaskets 80, and an insulated handle 96.

The housing 10A is preferably provided with support legs 98 of insulating material.

If desired, in a simplified embodiment of the invention, not shown, the electric immersion heater 46A may be omitted and the insulated legs 98 may be omitted, and the boiler may be simply heated on the top of a stove in order to provide for evaporation of the water in the boiler. Furthermore, in another simplification, (not shown), the automatic water inlet provided by the float valve 30A for the water in the condenser may be omitted. Thus, the valve 30A, and the float actuator 34A and the connecting rod 32A may be omitted, and water may simply be added manually from time to time in order to maintain the desired water level in the condenser.

Deleting both of the above features, the heating element 46A, and the automatic condenser water inlet connection provided by valve 30A greatly reduces the initial cost of the apparatus without seriously reducing the efficiency of operation, if the operation is closely supervised.

Figure 5:
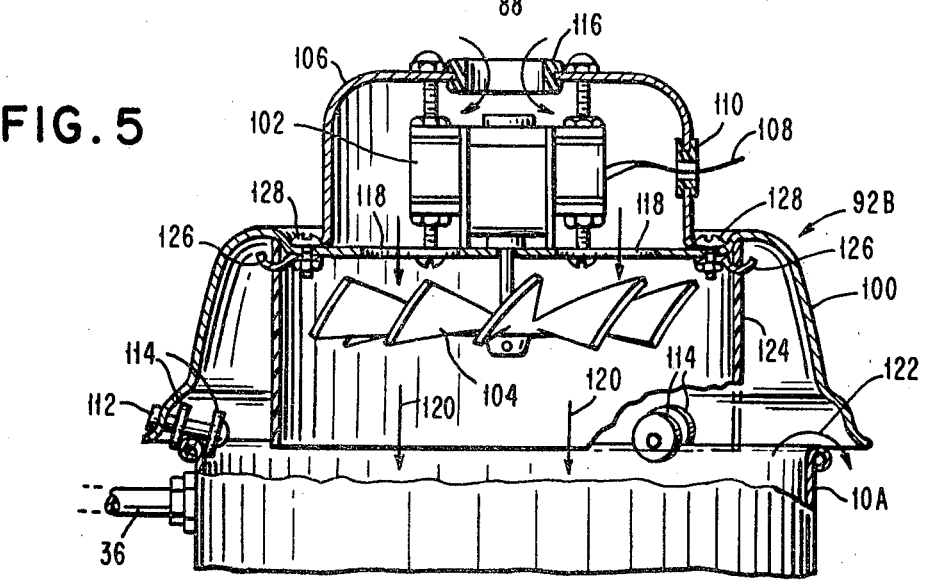
FIG. 5 is a partial sectional view of an air-cooled version of the embodiment of FIG. 4.

FIG. 5 is a partial sectional view of an air cooled version of the embodiment of FIG. 4. Stated another way, FIG. 5 illustrates a simple cover attachment 92B which may be substituted for the ventilated cover 92 of FIG. 4, and which includes an electric fan 104 for providing air cooling and evaporative cooling of the water 22A in the condenser compartment of the apparatus. Only the top portion of the container 10A of FIG. 4 is repeated in FIG. 5, but it is understood that all of the structure illustrated in FIG. 4 is employed in FIG. 5. However, the improvement of FIG. 5 may also be employed with the simplified versions of the apparatus of FIG. 4 in which the electric heater 46A may be omitted or the automatic water inlet valve 30A may be omitted, or both may be omitted, as discussed immediately above.

The air cooling-evaporative cooling cover attachment 92B of FIG. 5 includes a drawn shell body 100. To the central top portion of body 100 there is attached an electric motor 102. Motor 102 includes a motor shaft extending vertically downwardly through a central opening in body 100, to which is attached the fan 104. Attached to the top of the motor 102 is a metal cover 106. Power to motor 102 is supplied by an electric cord 108 extending through a side opening in the cover 106 cushioned by a rubber grommet 110. The entire cover assembly 92B is supported in spaced relationship to the upper edge of the container 10A by means of three or more diagonally downwardly and inwardly extending posts 112 attached to the edge of body 100 and including spaced shoulders 114 arranged to engage the inner and outer surfaces of the upper edge of container 10A, and to maintain the lower edge of the shell body 100 in spaced relation to the upper edge of the container 10A for the escape of air. The shoulders 114 of the post 112 may be formed by metal washers maintained in spaced relationship by cylindrical spacers supported upon a post body formed by a rivet.

In the cover 106, in addition to the opening cushioned by rubber grommet 110, at least one additional opening is preferably provided in the center portion thereof and fitted with a large rubber grommet 116. The use of the grommet 116 is optional, primarily to enhance the appearance of the apparatus. The main purpose of the opening at 116 is to permit the entrance of cooling air, as indicated by the arrows at 116.

The central portion of the shell body 100 also includes a number of openings beneath the cover 106, as indicated at 118 to permit a continuation of the flow of air admitted at 116 through the shell body 100, as indicated by the arrows at openings 118. The flow of air through 116 and 118 is induced by the fan 104, and since it passes through the motor chamber under the cover 106, it cools the fan motor 102. The air continues to flow downwardly from the fan 104 as indicated by the arrows 120 so that the air impinges upon the surface of the water 22A in the condenser. The air then flows radially outwardly across the surface of the water, and up and over the edge of the container 10A through the space between the upper edge of container 10A and the lower edge of the shell body 100, as indicated by the arrow 122.

In order to direct the flow of air from the fan 104 to the surface of the water in the condenser more effectively, a cylindrical baffle 124 is preferably provided which surrounds the periphery of the fan 104, and which may be attached to the shell body 100 by means of clamps 126 and screw threaded fastenings 128, as shown. The baffle 124 may be composed of a synthetic resin material and may simply consist of a cut section of a standard cylindrical plastic tube.

While the embodiments of FIGS. 4 and 5 of the invention may be constructed in various sizes, in a very convenient size for domestic use, the container housing 10A may have a height, exclusive of the legs 98, of about $9\frac{1}{2}$ inches, and an inside diameter of about 8 inches.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. Water distillation apparatus comprising a housing having a bottom, a peripheral side wall and an open top, a partition within and disposed transversely of said housing to form upper and lower chambers, a condenser within said upper chamber having an inlet and outlet, said inlet extending into said lower chamber and said outlet extending from said housing, tubular means coupling said chambers, means for supplying water to be distilled to said upper chamber to at least partially immerse said condenser and feed water to said lower chamber, means for controlling the flow of water to said lower chamber to maintain a predetermined water level therein, means for the circulation of air over the surface of the water in said upper chamber whereby the water in said lower chamber upon being heated will vaporize, flow through said condenser which is cooled by the surrounding water to condense the vapor and discharge the condensate, the heat imparted to the water in the upper chamber liberating volatile impurities in the water prior to distillation which impurities are constantly removed by said circulation means and an electric heating element in said lower chamber, said condenser comprising resilient tubing in the form of a coil with vertically spaced turns, an inlet on the uppermost turn and an outlet on the lowermost turn with the outlet extending through and secured to said housing wall, said partition including a peripheral gasket of resilient material engaging said partition and frictionally engaging the wall of said housing, and said inlet including means extending through and secured to said partition whereby said coil functions to impede displacement of said partition caused by pressure of steam in said lower chamber.

2. Water distillation apparatus comprising a substantially unitary housing having at least a bottom and a peripheral side wall, a partition within said housing to form upper and lower chambers, said partition having a peripheral gasket of resilient material frictionally engaging the wall of said housing, a condenser within said upper chamber and formed of resilient coiled tubing having vertically spaced turns, an inlet on the uppermost turn and an outlet on the lowermost turn, said outlet extending through and secured to the wall of said housing, said inlet including means extending downwardly through and secured to said partition, means for supplying water to be distilled to said upper chamber to at least partially immerse said condenser and feed water to said lower chamber, means for feeding water to said lower chamber, whereby the water in said lower chamber upon being heated will vaporize, flow through said condenser which is cooled by the surrounding water to condense the vapor and discharge the condensate, and said coil functions to impede displacement of said partition caused by pressure of steam in said lower chamber.

3. Water distillation apparatus according to claim 2 including means for circulating air over the surface of the water in said upper chamber.

4. A liquid distillation apparatus which is especially adapted for home use in distillation of water comprising an enclosed boiler, a condenser, said condenser comprising a condenser tube having a connection to said boiler for receiving and condensing vaporized liquid from said boiler, said condenser also comprising a housing surrounding said tube and arranged to be filled with liquid as a heat transfer medium for cooling said tube, means for cooling the heat transfer medium liquid within said condenser, and a connection from said condenser to said boiler for providing a portion of said heat transfer medium liquid to said boiler as preheated boiler make-up liquid, said preheated boiler make-up liquid being the exclusive source of make-up liquid for said boiler, said means for cooling said heat transfer medium liquid comprising means for draining off heated heat transfer medium liquid in addition to the heated heat transfer medium liquid consumed as preheated boiler make-up liquid and means for replacing the drained off liquid and the heat transfer medium liquid supplied to said boiler as preheated boiler make-up liquid with cool liquid, said means for cooling the heat transfer medium liquid within said condenser further comprising a thermostatic valve for controlling the exchange of heated heat transfer medium liquid with cool replacement liquid whenever the temperature of the heat transfer medium liquid exceeds a predetermined maximum value, said thermostatic valve being arranged and connected with a liquid outlet from said condenser housing to directly control the draining off of heat transfer medium liquid whenever the temperature of that liquid exceeds a predetermined maximum and wherein said means for cooling the heat transfer medium liquid includes a float valve connected and arranged with an inlet for cool liquid and operable to admit cool liquid to said condenser whenever the liquid level therein descends to a level below a predetermined minimum value.

5. Distillation apparatus as claimed in claim 4 wherein said thermostatic valve is calibrated to open in the neighborhood of 82° Centigrade and wherein the apparatus is especially adapted for distillation of water.

6. A liquid distillation apparatus which is especially adapted for home use in distillation of water comprising an enclosed boiler, a condenser, said condenser comprising a condenser tube having a connection to said boiler for receiving and condensing vaporized liquid from said boiler, said condenser also comprising a housing surrounding said tube and arranged to be filled with liquid as a heat transfer medium for cooling said tube, means for cooling the heat transfer medium liquid within said condenser, and a connection from said condenser to said boiler for providing a portion of said heat transfer medium liquid to said boiler as pre-heated boiler make-up liquid, said pre-heated boiler make-up liquid being the exclusive source of make-up liquid for said boiler, said means for cooling the heat transfer medium liquid within said condenser comprising means for replacing the heat transfer medium liquid supplied to said boiler as preheated boiler make-up liquid with cool liquid, and said means for cooling the heat transfer medium liquid within said condenser further comprising means for evaporatively cooling said heat transfer medium liquid, said means for evaporatively cooling said heat transfer medium liquid comprising at least one substantial air opening in the upper portion of said condenser housing and at least one fan arranged to direct a flow of air across the upper surface of said heat transfer medium liquid in order to promote evaporation thereof.

7. A liquid distillation apparatus which is especially adapted for small scale distillation of drinking water comprising a substantially unitary housing structure including a horizontal partition enclosing a boiler within the lower portion of said housing structure and enclosing a condenser above said partition within said housing structure, said partition including thermal insulating means to reduce heat transfer from said boiler to said condenser housing, a float-controlled inlet valve within said boiler for controlling the water level within said boiler by admitting additional water when the boiler water level is reduced, said condenser comprising a condenser tube having an inlet connection to said boiler through said partition for receiving and condensing vaporized liquid from said boiler, said tube being positioned within said condenser housing and being arranged to be surrounded and cooled by a liquid filling the remainder of said condenser housing as a heat transfer medium, the outlet end of said condenser tube extending through the side of said condenser housing for delivery of distilled liquid, said outlet end of said condenser tube being open to the atmosphere to thereby vent said boiler to the atmosphere through said condenser tube, means for cooling the heat transfer medium liquid within said condenser housing, said means for cooling the heat transfer medium liquid comprising means for evaporatively cooling said liquid, said cooling means comprising at least one substantial air opening in the upper portion of said condenser housing and at least one fan arranged to direct a flow of air across the upper surface of said heat transfer medium liquid in order to promote evaporation thereof.

8. Apparatus as claimed in claim 7 wherein
said fan is positioned and arranged for rotation upon a vertical axis to blow air downwardly over the surface of said condenser liquid,
with substantial openings being provided for the inlet of fresh air and the exhaust of air induced by the fan to flow over the surface of said condenser liquid.

9. A liquid distillation apparatus which is especially adapted for small scale distillation of drinking water comprising a substantially unitary housing structure including a horizontal partition enclosing a boiler within the lower portion of said housing structure and enclosing a condenser above said partition within said housing structure, said partition including thermal insulating means to reduce heat transfer from said boiler to said condenser housing, a float-controlled inlet valve within said boiler for controlling the water level within said boiler by admitting additional water when the boiler water level is reduced, said condenser comprising a condenser tube having an inlet connection to said boiler through said partition for receiving and condensing vaporized liquid from said boiler, said tube being positioned within said condenser housing and being arranged to be surrounded and cooled by a liquid filling the remainder of said condenser housing as a heat transfer medium, the outlet end of said condenser tube extending through the side of said condenser housing for delivery of distilled liquid, said outlet end of said condenser tube being open to the atmosphere to thereby vent said boiler to the atmosphere through said condenser tube, the side walls of said housing being substantially vertical and of substantially uniform cross-section, said partition is press-fitted into said housing and arranged to permit expansive upward movement to enlarge the boiler enclosure to relieve any excessive boiler pressure, and said partition comprises at least two metal plates with a U-shaped cross-section gasket of rubber-like material enclosing the outer edges of each plate to form a resilient seal of the edges of each plate to the side walls of said housing and to maintain the spacing between said plates, the resultant air space between said plates providing the thermal insulation of said partition.

* * * * *